United States Patent [19]
Kaufmann, Jr.

[11] 4,168,090
[45] Sep. 18, 1979

[54] EXPANSION COMPENSATING PIPE COUPLING

[76] Inventor: John Kaufmann, Jr., 3716 Woodrow Ave., Pittsburgh, Pa. 15227

[21] Appl. No.: 863,885

[22] Filed: Dec. 23, 1977

[51] Int. Cl.² .................................................. F16L 27/12
[52] U.S. Cl. ....................................... 285/302; 285/419
[58] Field of Search .............. 285/106, 302, 233, 419, 285/373, 234, 337, 353; 403/335, 338, 342, 104

[56] References Cited

U.S. PATENT DOCUMENTS

| 373,256 | 11/1887 | Traver et al. ............... 285/302 X |
| 1,204,728 | 11/1916 | Arena ................... 285/302 |
| 1,460,787 | 7/1923 | Burch ................. 285/302 X |
| 2,610,651 | 9/1952 | Hahn ................. 285/106 X |
| 2,646,967 | 7/1953 | Buccanero ............... 285/302 |
| 2,878,062 | 3/1959 | Crow .................. 285/106 X |
| 2,937,036 | 5/1960 | Watkins ............... 285/233 X |
| 3,154,328 | 10/1964 | Masse ................. 285/373 X |
| 3,223,438 | 12/1965 | DeCenzo ............... 285/233 |
| 3,383,125 | 5/1968 | Frost et al. ............. 285/106 X |
| 3,540,758 | 11/1970 | Torres ................. 285/233 |
| 3,873,138 | 3/1975 | Griffiths ............... 285/233 |

FOREIGN PATENT DOCUMENTS

| 254467 | 7/1926 | United Kingdom ............ 285/302 |
| 824986 | 12/1959 | United Kingdom ............ 285/302 |
| 867989 | 5/1961 | United Kingdom ............ 285/302 |

*Primary Examiner*—Thomas F. Callaghan

[57] ABSTRACT

An expansion compensating pipe coupling including a circumferential head on one end of one pipe section with the head slidably received in a cylinder secured to one end of another pipe section. Means is provided for retaining the pipe head in the cylinder for checked axial movement to compensate for axial pipe expansion and contraction. One or more expansion rings may be provided on the pipe head for providing a fluid seal. The expansion rings may further be received in annular grooves in the head with passages leading from the bottom of the groove to the interior of the pipe section thereby utilizing the fluid pressure within the coupling to expand the expansion rings in good fluid seal engagement with the interior of the cylinder.

4 Claims, 4 Drawing Figures

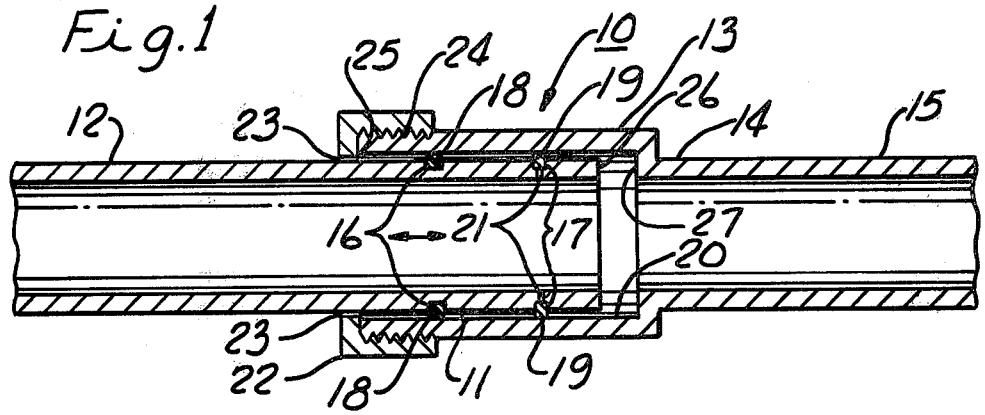
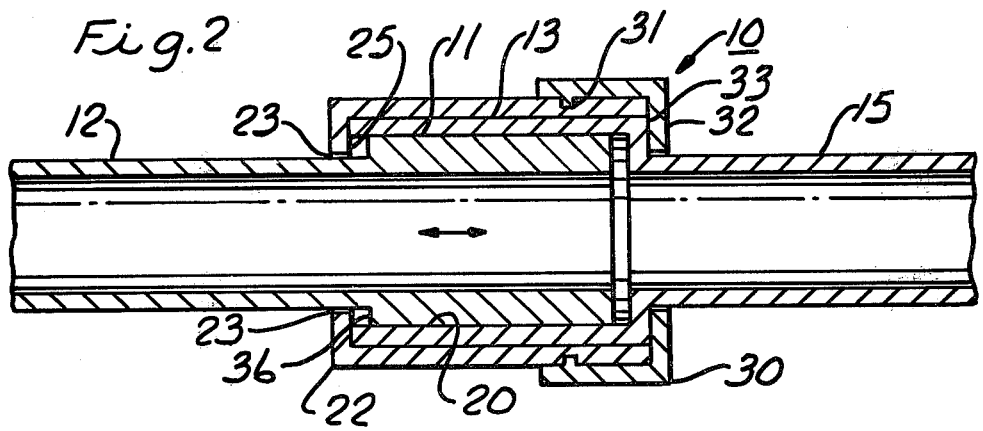
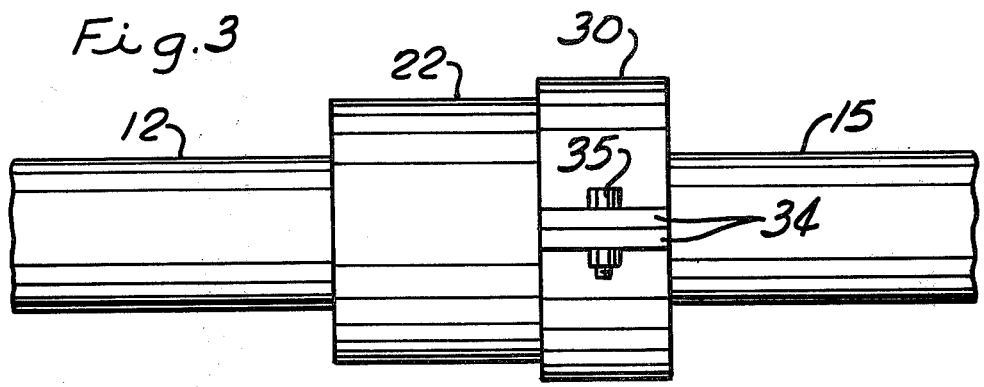
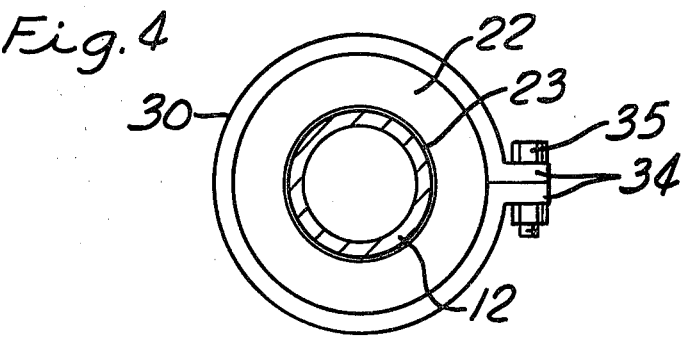

EXPANSION COMPENSATING PIPE COUPLING

BACKGROUND OF THE INVENTION

This invention relates generally to pipe couplings and more particularly to pipe couplings which provide means for compensating for the expansion and contraction of pipe lines subjected to great temperature variations.

Considerable problems have been encountered in the past with pipe couplings for long pipe lines which are exposed to extreme and varying temperature conditions in that the axial expansion and contraction of the pipe line places stresses on the couplings between pipe sections thereby causing leaks and ruptures. Expansion compensating pipe couplings of the prior art do not provide an adequate and assured fluid seal while compensating for these expansions and contractions. This is especially true for pipe lines which carry fluids (gas and liquid) under high pressures.

It is a principal object of the present invention to eliminate these shortcomings in the couplings of the prior art.

SUMMARY OF THE INVENTION

The expansion compensating pipe coupling of the present invention comprises a circumferential or cylindrical head on one end of a pipe section which is slidably received in a cylinder secured to one end of another pipe section. Means are provided for retaining the head within the cylinder for limited relative axial movement to compensate for axial pipe expansion and contraction.

Expansion rings are preferably provided on the head in order to provide a fluid seal. At least one expansion ring is provided and preferably two or more. The expansion rings may be conventional metal or plastic expansion rings, or they may be elastomeric O-rings, or a combination of both type rings. The expansion rings are usually seated in annular grooves on the pipe head and at least one passage may be provided through the head from the bottom of the expansion ring groove into the interior of the pipe section or coupling. This permits fluid under pressure being passed through the coupling to be transmitted to the underside of the expansion rings thereby expanding them into good sealing contact with the internal bore of the cylinder.

The retaining means for retaining the pipe head for limited reciprocal or axial movement within the cylinder generally includes a stop at the external end of the head which is received in the cylinder and a cooperative collar which is coaxially received over the first mentioned pipe section and secured to the second pipe section in a removable manner in order to retain the stop within the cylinder. The stop may be an annular shoulder of the pipe head or the exposed annular edge of an expansion ring, for example.

The pipe head may in fact consist of the natural terminal end of the pipe section itself.

BRIEF DESCRIPTION OF THE DRAWINGS

Other objects and advantages appear in the following description and claims.

The accompanying drawings show, for the purpose of exemplification without limiting the invention or the claims thereto, certain practical embodiments illustrating the principles of this invention wherein:

FIG. 1 is a side view in vertical cross section of one embodiment of the expansion compensating pipe coupling of the present invention.

FIG. 2 is a side view in vertical cross section of another embodiment of the expansion compensating pipe coupling of the present invention.

FIG. 3 is a view in side elevation of the expansion compensating pipe coupling illustrated in FIG. 2.

FIG. 4 is an end view of the expansion compensating pipe coupling of FIG. 3 as seen from the left-hand side of the Figure.

DESCRIPTION OF THE PREFERRED EMBODIMENTS

Referring to FIG. 1, the expansion compensating pipe coupling 10 of the present invention consists of the pipe head 11, which is the natural terminus or end of the first pipe section 12, and which is slidably received in cylinder 13 which is secured to one end 14 of a second pipe section 15.

Head 11 is provided with two annular expansion ring grooves 16 and 17 respectively, which in turn respectively receive expansion rings 18 and 19. Expansion ring 18 is in the form of a conventional elastomeric O-ring to provide a good fluid seal between head 11 and the cylindrical bore 20 of cylinder 13. Expansion ring 19 is in the form of a conventional single split expansion ring which seats into its respective annular groove 17 with reasonably close tolerance. Expansion ring 19 may be made of any suitable metal, or plastic, such as Nylon or Teflon. This type of expansion ring is generally used for lubricated surfaces, and Teflon rings are generally used for dry surfaces.

At least one passage 21 is provided through pipe head 11 to communicate the bottom of annular expansion ring groove 17 with the interior of pipe section 12. These passages permit the transmission of fluid pressure within the pipe section or coupling to the underside or annular inside of expansion ring 19 thereby utilizing the fluid pressures (gas or liquid) to expand ring 19 outwardly in good sealing engagement with bore 20 of cylinder 13. This arrangement is especially effective when fluids under high pressures are being transmitted through the pipe line and the coupling, and is equally effective when low pressures are being transmitted.

Means for retaining the head 11 within cylinder 13 is provided by the retaining collar 22 which is coaxially received over pipe section 12 with a small clearance 23 and is threadably secured on the end of cylinder 13 as indicated at 24. O-ring 18 therefore acts as a stop in the event that pipe section 12 is pulled to the left or head 11 is withdrawn from bore 20 as O-ring 18 engages the internal annular portion 25 of collar 22. Thus, collar 22 limits the extent of reciprocal movement of head 11 within cylinder 13 to the left, and reciprocal movement of the head 11 to the right is limited by engagement of end 26 of pipe section 12 with shoulder 27. Accordingly, limited axial reciprocal movement of head 11 is permitted within cylinder 13 to provide axial expansion and contraction compensation in the coupling 10 due to expansion and contraction of the pipe line made up of sections 12 and 15 when subjected to varying degrees of temperature.

Referring next to the embodiment illustrated in FIGS. 2, 3 and 4, like elements are designated with the same reference numerals as those indicated in FIG. 1. In this embodiment, head 11 is not provided with expansion rings, but instead is accurately machined to closely mate bore 20 of cylinder 13 to provide a good fluid seal.

In this embodiment, retaining collar 22 is secured to cylinder 13 by means of ring clamp 30 which is provided with an inside annular projection 31 as received in a mating annular groove in the external surface of retainer 22.

Ring clamp 31 is also provided with a vertical annular abutment wall 32 for engagement with the outside vertical annular shoulder 33 of cylinder 13. As is best seen in FIGS. 3 and 4, clamp ring 30 is provided with two terminus lips 34 which extend laterally outward from the coupling in order to receive an expansion pin or bolt 35 therethrough to clamp ring 30 in place. Ring 30 is sufficiently flexible that it can be axially slid or positioned into place by spacing clamping lips 34 to slightly open ring 30 and slide it over the outside cylindrical surface of retaining collar 22 until annular projection 31 seats into its annular groove as indicated in FIG. 2.

In this embodiment, the external-most annular shoulder 36 of head 11 acts as a stop from the cylinder to O-ring 18 in the structure of FIG. 1 for engagement with annular abutment 25 of retaining collar 22.

Any suitable arrangement of rings may be provided on head 11. For example, the rings may both be of the conventional expansion type rings or they may all be of the elastomeric O-ring type, as the coupling receives very limited reciprocation of head 11 within cylinder 13 and therefore the rings receive very little wear. However, it is important to obtain a good seal, as illustrated, when high pressure fluids are being transmitted through the pipe line.

The pipe sections and the coupling parts may all be made of conventional metal or plastic or alloy presently on the market.

I claim:

1. An expansion compensating pipe coupling for two pipes having respective end sections in alignment with one another, one of said end sections defining an enlarged portion with the other end section disposed therein, means for retaining the other end section in said enlarged portion for limited reciprocal movement to compensate for axial pipe expansion and contraction, said means including a thickened portion on said other end section slidably engaging the enlarged portion to provide a fluid seal therebetween, a sleeve contiguously positioned over said enlarged portion and being of the same substantial length thereof and having a section thereof turned downwardly and extending adjacent said other end section whereby the same can be engaged by said thickened portion, and a clamping ring disposed over said sleeve opposite said downturned end, said ring having a locating projection disposed interiorly thereof seating in a recess in said sleeve for locating one to the other, a downturned flange on said ring engaging the enlarged portion and the sleeve for maintaining the same in fixed position, and means locking said ring in place.

2. The coupling of claim 1 wherein the clamping ring is formed with mating lips extending outwardly therefrom, aligned openings disposed therein, and securing means positioned in said openings.

3. The coupling of claim 2 wherein the securing means comprises nut and bolt means extending through said openings.

4. The coupling of claim 3 wherein the component parts thereof are annular in configuration.

* * * * *